US011450070B2

(12) United States Patent
So et al.

(10) Patent No.: US 11,450,070 B2
(45) Date of Patent: Sep. 20, 2022

(54) ALERTS OF MIXED REALITY DEVICES

(71) Applicant: Hewlett-Packard Development Company, L.P., Spring, TX (US)

(72) Inventors: Chi So, Spring, TX (US); Juan Martinez, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/040,080

(22) PCT Filed: Jun. 20, 2018

(86) PCT No.: PCT/US2018/038420
§ 371 (c)(1),
(2) Date: Sep. 22, 2020

(87) PCT Pub. No.: WO2019/245543
PCT Pub. Date: Dec. 26, 2019

(65) Prior Publication Data
US 2022/0005280 A1    Jan. 6, 2022

(51) Int. Cl.
*G06T 19/00* (2011.01)
*G06V 20/20* (2022.01)
*G06F 3/01* (2006.01)

(52) U.S. Cl.
CPC ............ *G06T 19/006* (2013.01); *G06F 3/016* (2013.01); *G06V 20/20* (2022.01)

(58) Field of Classification Search
CPC ... G06T 19/006; G06F 3/016; G06K 9/00671; G05B 15/02; F24F 11/52; F24F 11/523; F24F 11/526; G06V 20/20; G08B 7/06; G08B 19/00
See application file for complete search history.

(56) References Cited

U.S. PATENT DOCUMENTS

| 5,900,849 A | 5/1999 | Gallery |
| 9,552,676 B2 | 1/2017 | Wong et al. |
| 11,190,753 B1 * | 11/2021 | Meier ..................... G01S 17/89 |
| 2005/0091213 A1 | 4/2005 | Schutz et al. |
| 2008/0266079 A1 * | 10/2008 | Lontka ................. G08B 25/016 |
| | | 340/539.1 |
| 2011/0115816 A1 | 5/2011 | Brackney |
| 2013/0293586 A1 * | 11/2013 | Kaino ...................... G06F 3/14 |
| | | 345/633 |
| 2014/0225978 A1 | 8/2014 | Saban et al. |
| 2016/0027212 A1 | 1/2016 | Da Veiga et al. |
| 2016/0124502 A1 | 5/2016 | Sawyer et al. |
| 2016/0127931 A1 | 5/2016 | Baxley et al. |

(Continued)

FOREIGN PATENT DOCUMENTS

| CN | 202502598 U | 10/2012 |
| CN | 112005282 A | 11/2020 |

(Continued)

*Primary Examiner* — Jeffery A Brier
(74) *Attorney, Agent, or Firm* — Brooks Cameron & Huebsch PLLC

(57) ABSTRACT

In some examples, a system for alerts of mixed reality (MR) devices includes a receiver engine to receive an input from a building sensor in response to the building sensor detecting an event, and a generator engine to cause a MR device to generate an alert in response to the input from the building sensor.

16 Claims, 4 Drawing Sheets

(56) References Cited

U.S. PATENT DOCUMENTS

| | | |
|---|---|---|
| 2017/0053440 A1 | 2/2017 | Yoon et al. |
| 2017/0123747 A1 | 5/2017 | Rochford et al. |
| 2017/0287215 A1 | 10/2017 | Lalonde et al. |
| 2017/0322715 A1* | 11/2017 | Cohrt ................... G06F 3/011 |
| 2018/0012074 A1 | 1/2018 | Holz et al. |
| 2018/0018862 A1 | 1/2018 | Kerzner |
| 2018/0095542 A1 | 4/2018 | Mallinson |

FOREIGN PATENT DOCUMENTS

| | | |
|---|---|---|
| RU | 2370817 C2 | 10/2009 |
| WO | 2012/001720 A1 | 1/2012 |
| WO | WO2012101720 A1 | 8/2012 |
| WO | WO2016120806 A1 | 8/2016 |
| WO | 2017/031089 A1 | 2/2017 |
| WO | WO2018022523 A1 | 2/2018 |

* cited by examiner

ALERTS OF MIXED REALITY DEVICES

BACKGROUND

Head mounted mixed reality (MR) devices may be used to provide an altered reality to a user. A MR device may include a virtual reality (VR) device and/or an augmented reality (AR) device. MR devices may include displays to provide a "virtual and/or augmented" reality experience to the user by providing video, images, and/or other visual stimuli to the user via the displays. MR devices may include audio output devices to provide audible stimuli to the user to further the virtual reality experienced by the user. MR devices may be worn by a user.

DETAILED DESCRIPTION

MR devices can be head mounted devices. As used herein, the term "MR device" refers to a device that provides a mixed reality to a user. As used herein, the term "mixed reality" refers to a computing device generated scenario that simulates experience through senses and perception. In some examples, a MR device may cover a user's eyes and provide visual stimuli to the user via a display, thereby substituting a "mixed" reality (e.g., a "virtual reality" and/or "augmented reality") for actual reality. In some examples, a MR device may cover a user's ears and provide audible stimuli to the user via audio output devices to enhance or contribute to the virtual reality experienced by the user. In some examples, a MR device may provide an overlay transparent or semi-transparent screen in front of a user's eyes such that reality is "augmented" with additional information such as graphical representations and/or supplemental data. For example, an MR device may overlay transparent or semi-transparent weather information, directions, and/or other information on an MR display for a user to examine.

As a result of MR devices covering a user's eyes and/or ears, the user may be immersed in the virtual reality created by a MR device. The immersive MR experience can allow the user to experience a virtual reality with realistic images, sounds, and/or other sensations.

However, in order to provide the immersive virtual reality experience, the user's eyes and/or ears may be covered by the MR device. As a result, the user may not be aware of the user's physical surrounding environment. As used herein, the term "environment" refers to a space in which the MR device is located that includes an aggregate of surrounding things, conditions, and/or influences in the space. For example, the environment may be a room in a building having furniture, electronics, lighting, etc., and may include doors and/or windows through which other people or animals (e.g., pets) may enter/exit. Due to the immersive capabilities of MR devices, a user may not be aware of the surrounding things (e.g., furniture, electronic devices, eta), people, and/or animals that may enter/traverse the space.

Alerts of virtual reality devices can allow for a user of a MR device to be alerted to things outside of the MR experience. A user who is immersed in a MR experience can be alerted to occurrences around a building and/or the environment in which the MR device is located in. As a result, the user of the MR device can be more aware of the environment outside of the MR experience.

Figure 1:
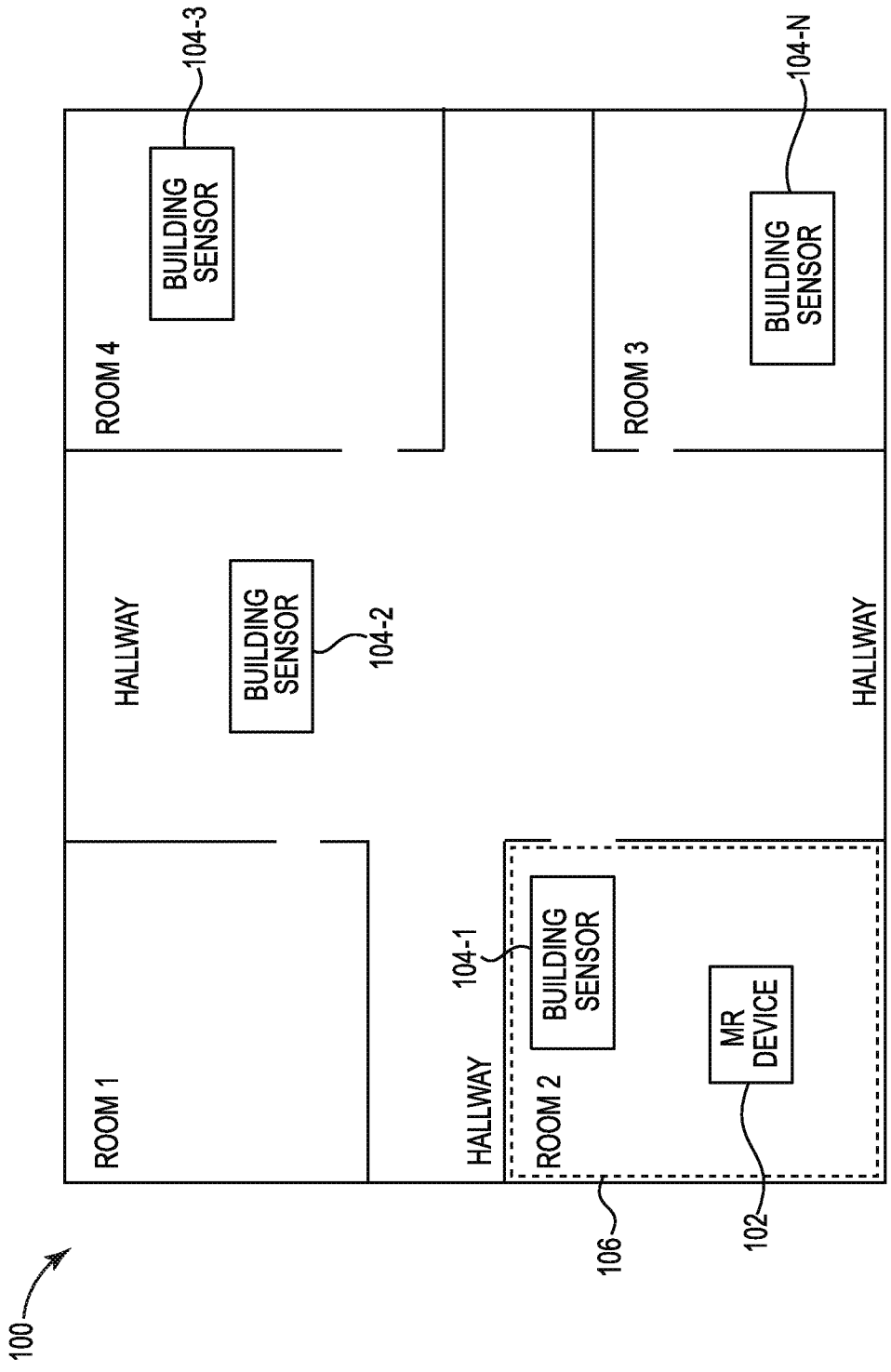
FIG. 1 illustrates an example of a building suitable for alerts of virtual reality devices consistent with the disclosure.

FIG. 1 illustrates an example of a building 100 suitable for alerts of virtual reality devices consistent with the disclosure. Building 100 can include a MR device 102, building sensors 104-1, 104-2, 104-3, 104-N (referred to collectively as building sensors 104), and environment 106.

As illustrated in FIG. 1, MR device 102 can be located in building 100. Specifically, MR device 102 can be located in Room 2 of building 100. A user may be utilizing MR device 102 in order to experience a "virtual and/or augmented" reality in Room 2 of building 100. For example, building 100 can be a residential home and Room 2 can be a common area in the residential home, A user may utilize MR device 102 to experience a "virtual and/or augmented reality" while being located in Room 2 of building 100. As used herein, "a" can refer to one such thing or more than one such thing.

Building 100 can include building sensors 104. As used herein, the term "building sensor" refers to a device that can transmit a signal in response to a stimulus. For example, building sensors 104 can transmit a signal in response to light, motion, audio, visual, and/or other stimuli, as is further described herein.

Building sensors 104 can be included in a building automation system. As used herein, the term "building automation system" refers to a system that can monitor and/or control a building and/or components of the building. For example, a user can control devices, equipment (e.g., heating, ventilation, and air conditioning (HVAC) equipment), networks, and/or space conditions of building 100 utilizing the building automation system. The building automation system can utilize a network relationship to interconnect components of the building. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, a Bluetooth network relationship, and/or the Internet, among other types of network relationships. Examples of a building automation system can include a building security system, a smart home system including interconnected smart devices (e.g., Amazon Alexa, Google Home, etc.), Internet of Things enabled devices, etc. In other words, MR device 102 can interface with the building automation system and/or devices associated with the building automation system in order to receive inputs from building sensors 104 and/or devices associated with the building automation system in order to generate alerts.

A controller can receive an input from a building sensor of the building sensors 104. Although not illustrated in FIG. 1 for clarity and so as not to obscure examples of the disclosure, the controller can be included in MR device 102. However, examples of the disclosure are not so limited. For example, the controller can be located remotely from MR device 102. The controller can receive the input from a building sensor of the building sensors 104 via a network relationship, as described above.

Although not illustrated in FIG. 1 for clarity and so as not to obscure examples of the disclosure, the controller of MR device 102 can include a processing resource and a memory resource. The processing resource may be a central processing unit (CPU), a semiconductor based microprocessor, and/or other hardware devices suitable for retrieval and execution of machine-readable instructions stored in a memory resource. The processing resource may fetch, decode, and execute the instructions. As an alternative or in addition to retrieving and executing the instructions, the processing resource may include a plurality of electronic circuits that include electronic components for performing the functionality of the instructions.

The memory resource may be any electronic, magnetic, optical, or other physical storage device that stores executable instructions and/or data. Thus, the memory resource may be, for example, Random Access Memory (RAM), an Electrically-Erasable Programmable Read-Only Memory (EEPROM), a storage drive, an optical disc, and the like. The memory resource may be disposed within the controller of MR device 102. Additionally and/or alternatively, the memory resource may be a portable, external or remote storage medium, for example, that allows the controller to download the instructions from the portable/external/remote storage medium.

The controller can receive the input from a building sensor included in a building automation system of building 100 in response to the building sensor detecting an event. The controller can receive the input from a building sensor via a wired or wireless network relationship. As used herein, the term "event" refers to an occurrence of an action. The event can include detection of an object, detection of an action, a change in a state of being of a device or space (e.g., a device being modified, turned on, turned off, etc.), among other types of events. The event can be detected by a particular building sensor (e.g., building sensor 104-2) of the building sensors 104, as is further described herein.

As described above, building sensors 104 can transmit a signal in response to light, motion, audio, visual, and/or other stimuli. A building sensor can be, for example, a light sensor, a motion sensor, an audio sensor, a visual sensor, an ingress sensor, among other types of sensors, as is further described herein.

In some examples, building sensors 104 can include a light sensor. As used herein, the term "light sensor" refers to a device that senses light or other electromagnetic energy. Examples of light sensors can include photoemission or photoelectric light sensors, semiconductor light sensors, photovoltaic light sensors, thermal light sensors, photochemical light sensors, polarization light sensors, among other types of light sensors.

Light sensors can detect a presence and/or a change in light levels of a space. For example, building sensor 104-1 can be a light sensor and can detect a change in light level in environment 106 of Room 2. The change in light level can, in some examples, be a result of a light switch being turned on, off, a light level being dimmed or brightened, a change in light level of a different device (e.g., a television) being turned on or off, window blinds being opened or closed (e.g., resulting in more or less ambient light entering environment 106), a power outage, among other types of changes in light level. Additionally, the change in light level can be detected outside of environment 106 by, for example, building sensor 104-3, as is further described herein.

In some examples, the light sensor can detect the presence and/or change in light level and the controller can distinguish between causes of the change in light level. For instance, the light sensor can detect the light level of Room 2 changing as a result of lights turning on or off in the room as well as a change in light level as a result of a television or other display. The controller can distinguish between the types of light level changes and cause or refrain from causing an alert accordingly, as is further described herein.

In some examples, building sensors 104 can include a motion sensor. As used herein, the term "motion sensor" refers to a device that detects movement of objects. Examples of motion sensors can include passive infrared (PIR) motion sensors, microwave motion sensors, ultrasonic motion sensors, tomographic motion sensors, gesture detection motion sensors, among other types of motion sensors.

Motion sensors can detect motion in, around, and/or outside of a space. For example, building sensor 104-1 can be a motion sensor and can detect motion in environment 106 of Room 2. The motion can, in some examples, be the motion of another person other than the user of MR device 102 entering Room 2, motion of an animal such as a pet entering Room 2, motion outside of Room 2 (e.g., external to building 100 such as through a window), motion of an object (e.g., an inanimate object) in Room 2, among other types of motion. Additionally, the motion can be detected outside of environment 106 by, for example, building sensor 104-3, as is further described herein. As an example, building sensor 104-3 can detect motion, including but not limited to types of motion described above, in Room 4 of building 100.

In some examples, the motion sensor can detect movement and the controller can distinguish between various movements. For instance, the motion sensor can detect the motion the user of MR device 102 and the motion of a person entering a room. The controller can distinguish between the types of movements and cause or refrain from causing an alert accordingly, as is further described herein.

In some examples, building sensors 104 can include an audio sensor. As used herein, the term "audio sensor" refers to a device that detects the presence of sound. In other words, an audio sensor can detect the presence of audible waves of pressure. In some examples, an audio sensor can include a microphone. As used herein, the term "microphone" refers to a transducer that converts sound into an electrical signal.

Audio sensors can detect the presence of sound. For example, building sensor 104-1 can be an audio sensor and can detect sound in environment 106 of Room 2. The sound can, in some examples, be sound from footsteps of a person or animal in Room 2, sound of objects inside of Room 2 (e.g., sound of a television in Room 2, sound of a ringtone of a mobile device, etc.), sound of objects outside of Room 2 (e.g., a doorbell, an alert from a kitchen appliance, etc.), among other types of sounds. Additionally, the sound can be detected outside of environment 106 by, for example, building sensor 104-3, as is further described herein. As an example, building sensor 104-3 can detect sound such as a doorbell that occurs outside of environment 106.

In some examples, the audio sensor can detect sounds and the controller can distinguish between various sounds. For instance, the audio sensor can detect the sound of footsteps of a person entering a room and a sound of an appliance turning on. As another example, the audio sensor can determine that a detected sound is the sound of an appliance turning on, running, etc. The controller can distinguish between the types of sounds and cause or refrain from causing an alert accordingly, as is further described herein.

In some examples, building sensors 104 can include a visual sensor. As used herein, the term "visual sensor" refers to a device that records/captures images. The images may be still images (e.g., photographs) or a sequence of images (e.g., video). Examples of visual sensors can include a PIR camera, Time of Flight (ToF) camera, closed circuit television (CCTV) camera, pan-tilt-zoom camera, light-field camera, mobile camera, among other types of visual sensors.

Visual sensors can capture images in environment 106 of Room 2. The images can, in some examples, be images of events occurring in Room 2. Additionally, images can be captured outside of environment 106 by, for example, building sensor 104-3, as is further described herein. As an example, building sensor 104-3 can capture images in Room 4 of building 100, As another example, building 100 can include external visual sensors (e.g., not illustrated in FIG. 1 for clarity and so as not to obscure examples of the disclosure) that can be utilized as security cameras that can capture images external to building 100.

In some examples, the visual sensor can record images and the controller can distinguish between various images. For instance, the visual sensor can detect an amount of change between images. For example, the visual sensor can capture several images and the controller can compare the images to determine differences between them. The controller can determine an amount of change between the images and cause or refrain from causing an alert accordingly, as is further described herein.

In some examples, building sensors 104 can include an ingress sensor. As used herein, the term "ingress sensor" refers to a device that detects events related to ingress points of building 100.

Ingress sensors can include a combination of the sensors described above to detect events at ingress points of building 100 such as windows, doors, garage doors, access panels, vents, etc. Ingress sensors can detect events in which a window is opened/closed, a door is opened/closed, garage doors are opened/closed, access panels are accessed, vents are accessed, etc. Building sensor 104-1 can be an ingress sensor. Additionally, building sensor 104-3 (located external to environment 106) can be an ingress sensor.

In some examples, building sensors 104 can include a safety sensor. As used herein, the term "safety sensor" refers to a device that detects unsafe conditions of building 100. Examples of safety sensors can include smoke detectors, fire detectors, carbon monoxide detectors, gas detectors, among other types of safety sensors.

Safety sensors can detect unsafe conditions in environment 106 of Room 2. For example, building sensor 104-1 can be a safety sensor and can detect an unsafe condition such as, for example, smoke, fire, dangerous levels of gas such as carbon monoxide in Room 2, among other types of unsafe conditions. Additionally, unsafe conditions can be detected outside of environment 106 by, for example, building sensor 104-3, as is further described herein. For example, building sensor 104-3 can detect smoke, fire, and/or dangerous levels of gas or other unsafe conditions in Room 4 of building 100.

In some examples, building sensors 104 can be included as part of devices in building 100. For example, building sensors 104 can be included in appliances (e.g., kitchen appliances, washing machines, etc.), electronic devices (e.g., televisions, tablets, mobile devices, computing devices, etc.), lighting devices, outdoor devices (e.g., sprinklers, outdoor lighting, etc.), HVAC devices (e.g., thermostat, etc.), among other devices. For instance, building sensor 104-3 can detect that outdoor sprinklers have been turned on.

Since a user of MR device 102 may be immersed in the "virtual and/or augmented reality" created by MR device 102, it can be beneficial for a user to know about the user's surroundings. The user can be alerted to the detection of events by the above described sensors so that the user is aware of the environment outside of the "virtual and/or augmented reality" created by MR device 102, as is further described herein.

Building sensors 104 can be located in an environment in which MR device 102 is located. For example, as illustrated in FIG. 1, building sensor 104-1 can be located in environment 106 of Room 2, in which MR device 102 is located. As a result of the location of building sensor 104-1, building sensor 104-1 can detect an event in environment 106 in which MR device 102 is located. For example, building sensor 104-1 can be a smoke detector and detect the presence of smoke in environment 106, among other types of examples.

Building sensors 104 can be located outside of an environment in which MR device 102 is located. For example, as illustrated in FIG. 1, building sensors 104-2, 104-3, 104-N can be located outside of environment 106 of Room 2, in which MR device 102 is located. As a result of the location of building sensors 104-2, 104-3, 104-N, building sensors 104-2, 104-3, 104-N can detect an event outside of environment 106 in which MR device 102 is located. For example, building sensor 104-2 can be an audio sensor and detect the doorbell of building 100 having been rung, among other types of examples.

The controller of MR device 102 can determine alert details based on an input from building sensors 104. For example, building sensors 104 can detect an event, as described above, and transmit the event to the controller of MR device 102. Based on the input from building sensors 104, the controller can determine alert details.

In some examples, the alert details can include a type of building sensor that detected the event. For example, the controller can determine the building sensor is a light sensor, a motion sensor, an audio sensor, a visual sensor, an ingress sensor, and/or a safety sensor, among other types of sensors.

In some examples, the alert details can include a location of the building sensor that detected the event. For example, the controller can determine the building sensor that detected the event is building sensor 104-2 and is located in the hallway of building 100.

The controller can generate an alert in response to the input from building sensors 104. The alert can include a visual alert, an audio alert, and/or a haptic feedback alert, among other types of alerts. As used herein, the term "haptic" refers to a mechanical stimulation such as a vibration to a user.

The controller can cause the alert to be visually displayed via a display of MR device 102. As used herein, the term "display" refers to a device to visually present information to a user. The visual alert can be visually displayed on a display of MR device 102 and include the determined alert details. For example, MR device 102 can visually display the alert, including the type of building sensor that detected the event and the location of the building sensor that detected the event. Continuing with the example above, building sensor 104-2 can be an audio sensor that detects a doorbell of building 100 being rung. The controller can cause the alert (e.g., the doorbell having been rung), including the alert details, to be displayed visually on the display of MR device 102, where the alert details include the building sensor (e.g., building sensor 104-2) that detected the event, the type of building sensor (e.g., an audio sensor), and the location of building sensor 104-2 (e.g., the hallway of building 100).

In some examples, the visually displayed alert can include a direction of the building sensor that detected the event from MR device 102 relative to the orientation of MR device 102. As used herein, the term "orientation" refers to a position of MR device 102 in relation to its surroundings in building 100. For example, the orientation of MR device 102 can refer to the direction MR device 102 is facing in environment 106. For instance, MR device 102 can be facing away from building sensor 104-1 as oriented in FIG. 1.

As described above, the alert details can include the building sensor 104-2 that detected the event. The controller can determine the location of the building sensor 104-2 (e.g., hallway) relative to the location of MR device 102 (e.g., Room 2) and the orientation of MR device 102 (e.g., facing away from building sensor 104-1). The visually displayed alert on the display of MR device 102 can include the direction of building sensor 104-2 from MR device 102 based on the orientation of MR device 102, where the direction displayed on the display of MR device 102 can indicate to the user of MR device 102 that building sensor 104-2 that detected the event is in an opposite direction to the orientation of MR device 102.

In some examples, the display of MR device 102 can display the distance from MR device 102 to the building sensor 104 that detected the event. For example, the alert details can include the building sensor 104-2 that detected the event, and the controller can determine the location of the building sensor 104-2 (e.g., hallway) relative to the location of MR device 102 (e.g., Room 2). Based on the location of the MR device 102 and the location of building sensor 104-2, the display of MR device 102 can display the distance from MR device 102 to the building sensor 104 that detected the event.

The controller can cause the alert to be an audio alert. The audio alert can be an audible alert emitted by an audio output device of MR device 102. As used herein, the term "audio output device" refers to a device capable of converting electrical signals to sound and/or pressure waves. In some examples, the audio output device can be a speaker. As used herein, the term "speaker" refers to a device such as an electroacoustic transducer which can convert an electrical signal to an audio output such as sound and/or pressure waves. For example, the audio alert can be an audible sound emitted by a speaker or speakers included with MR device 102.

Similar to the visually displayed alert, the audio alert can include determined alert details. For example, audio output devices of MR device 102 can audibly emit sounds describing the type of building sensor that detected the event and the location of the building sensor that detected the event. Additionally, the audio output devices of MR device 102 can audibly emit sounds describing the direction of the building sensor 104 that detected the event from MR device 102 and the distance from the MR device 102 to the building sensor 104 that detected the event.

The controller can cause the alert to be a haptic feedback alert. The haptic feedback alert can be a mechanical stimulation to a user to inform the user of the alert. The haptic feedback alert can be a vibrational alert by mechanical stimulation via vibrating pads of MR device 102.

In some examples, the controller can refrain from causing an alert based on a detected change in light level. For example, the light sensor can detect the light level of Room 2 changing as a result of lights turning on or off in the room as well as a change in light level as a result of a television. The controller can refrain from causing an alert based on a light level threshold. The controller can refrain from causing an alert in response to a light level detected by the light sensor being less than a threshold light level, and cause the alert in response to a light level detected by the light sensor being greater than the threshold light level. In some examples, the light sensor can detect changes in the lighting in Room 2 as a result of a television in Room 2 and determine the light level changes in Room 2 as a result of the television is less than the threshold light level. As a result, the controller can refrain from causing the alert based on the change in light level as a result of the television in Room 2. In some examples, the light sensor can detect changes in the lighting in Room 2 as a result of a light in Room 2 being turned on or off and determine the light level changes in Room 2 as a result of the light being turned on or off is greater than the threshold light level. As a result, the controller can cause the alert based on the change in light level as a result of the light in Room 2 being turned on or off. The threshold light level can be configurable.

In some examples, the controller can refrain from causing an alert based on a detected motion. As described above, the controller can distinguish between types of movements. For example, the motion sensor can detect the motion the user of MR device 102 and the motion of a person entering Room 2. The controller can cause an alert in response to the detected motion of the person entering Room 2, and refrain from causing an alert in response to the detected motion of the user of MR device 102.

In some examples, the controller can refrain from causing an alert based on a sound threshold. The controller can refrain from causing an alert in response to a sound detected by the audio sensor being less than a threshold decibel (dB) level, and cause the alert in response to the sound being greater than the threshold dB level. For example, the audio sensor can detect an appliance turning on and determine the sound level of the appliance turning on is thirty-five dB. The controller can refrain from causing the alert in response to the sound of the appliance (e.g., thirty-five dB) being less than the threshold dB level (e.g., fifty-five dB). Further, the audio sensor can detect a conversation by people in Room 2 and determine the sound level of the conversation is sixty dB and as a result, cause the alert in response to the sound of the conversation being greater than the threshold dB level (e.g., fifty-five dB). The threshold dB level can be configurable.

In some examples, the controller can refrain from causing an alert based on a detected change in images captured by the visual sensor. For example, the visual sensor can capture several images while a person is walking into Room 2. The controller can compare the images to detect an amount of change between images. Based on the change in the images as a result of the person walking into Room 2, the controller can cause an alert. As another example, the visual sensor can capture several images and the controller can compare the images to determine no changes or small changes between the images. Based on the little to no change in the images, the controller can refrain from causing an alert. In some examples, the amount of change can be a threshold, such as a threshold percentage of change. The controller can refrain from causing an alert in response to the percentage of change between images being less than the threshold percentage of change between images, or cause an alert in response to the percentage of change between images being greater than the threshold percentage of change between images. The threshold percentage of change can be configurable.

In some examples, the controller can refrain from causing an alert based on detected events at ingress points in response to a location of an ingress sensor detecting the event. For example, an ingress sensor can determine an event such as a bedroom door for Room 4 being opened or closed and based on the ingress sensor being that of a door for Room 4 (e.g., because the user of MR device 102 is not in Room 4 but is rather in Room 2), can refrain from causing an alert. The ingress sensors that cause or not cause an alert based on detected events can be configurable. For example, the controller can cause an alert based on ingress sensors for a front door, garage door, door to Room 2, etc. detecting an event, but can refrain from causing an alert for events detected by ingress sensors at other ingress points.

Since a MR experience can be immersive, a user may not always be situationally aware of events happening around them. Alerts of virtual reality devices can provide a user with understanding of the user's surroundings outside of the "virtual and/or augmented reality" provided by MR device 102. The alerts can allow for an immersive MR experience, while also providing for safe operation of the MR device and awareness of the surrounding environment.

Figure 2:
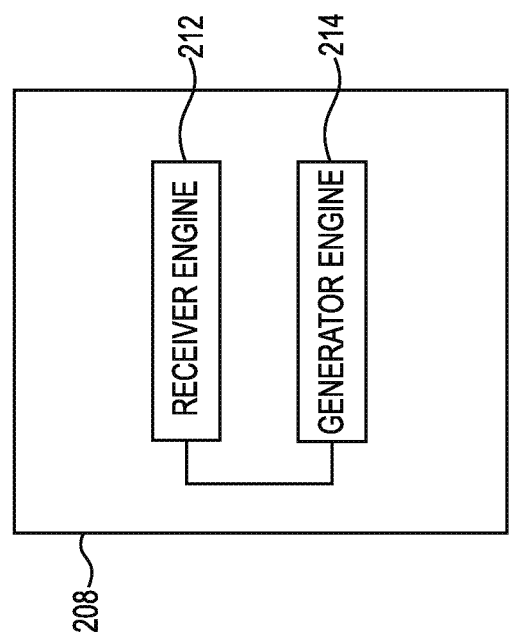
FIG. 2 illustrates an example of a system for alerts of virtual reality devices consistent with the disclosure.

FIG. 2 illustrates an example of a system 208 for alerts of virtual reality devices consistent with the disclosure. The system 208 can be a plurality of engines (receiver engine 212, generator engine 214). The system 208 can include additional or fewer engines that are illustrated to perform the various elements as described in connection with FIG. 1.

The plurality of engines (e.g., receiver engine 212, generator engine 214) can include a combination of hardware and machine-readable instructions (e.g., stored in a memory resource such as a non-transitory machine readable medium) that are executable using hardware components such as a processor, but at least hardware, to perform elements described herein (e.g., receive an input from a building sensor in response to the building sensor detecting an event, cause a MR device to generate an alert in response to the input from the building sensor, etc.)

The receiver engine 212 can include hardware and/or a combination of hardware and machine-readable instructions, but at least hardware, to receive an input from a building sensor in response to the building sensor detecting an event. The input can be received by a MR device via a network relationship. For example, the input can be wirelessly received by the MR device. The building sensor can be, for example, a light sensor, a motion sensor, an audio sensor, a visual sensor, an ingress sensor, among other types of sensors.

The generator engine 214 can include hardware and/or a combination of hardware and machine-readable instructions, but at least hardware, to cause a MR device to generate an alert in response to the input from the building sensor. The alert can include a visual alert, an audio alert, and/or a haptic feedback alert, among other types of alerts.

Figure 3:
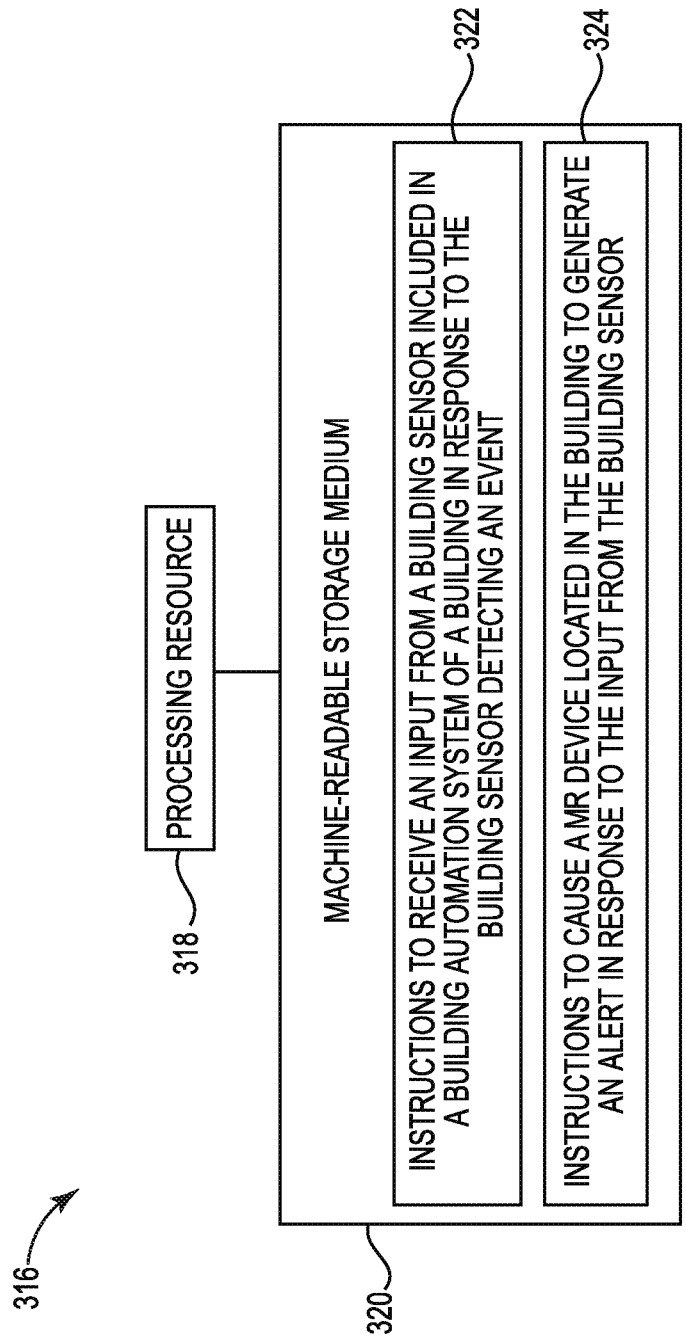
FIG. 3 illustrates a block diagram of an example of a system suitable for alerts of virtual reality devices consistent with the disclosure.

FIG. 3 illustrates a block diagram of an example of a system 316 suitable for alerts of virtual reality devices consistent with the disclosure. In the example of FIG. 3, system 316 includes a processing resource 318 and a machine-readable storage medium 320. Although the following descriptions refer to an individual processing resource and an individual machine-readable storage medium, the descriptions may also apply to a system with multiple processing resources and multiple machine-readable storage mediums. In such examples, the instructions may be distributed across multiple machine-readable storage mediums and the instructions may be distributed across multiple processing resources. Put another way, the instructions may be stored across multiple machine-readable storage mediums and executed across multiple processing resources, such as in a distributed computing environment.

Processing resource 318 may be a central processing unit (CPU), microprocessor, and/or other hardware device suitable for retrieval and execution of instructions stored in machine readable storage medium 320. In the particular example shown in FIG. 3, processing resource 318 may receive, determine, and send instructions 322 and 324. As an alternative or in addition to retrieving and executing instructions, processing resource 318 may include an electronic circuit comprising an electronic component for performing the operations of the instructions in machine-readable storage medium 320. With respect to the executable instruction representations or boxes described and shown herein, it should be understood that part or all of the executable instructions and/or electronic circuits included within one box may be included in a different box shown in the figures or in a different box not shown.

Machine-readable storage medium 320 may be any electronic, magnetic, optical, or other physical storage device that stores executable instructions. Thus, machine readable storage medium 320 may be, for example, Random Access Memory (RAM), an Electrically-Erasable Programmable Read-Only Memory (EEPROM), a storage drive, an optical disc, and the like. The executable instructions may be "installed" on the system 316 illustrated in FIG. 3. Machine-readable storage medium 320 may be a portable, external or remote storage medium, for example, that allows the system 316 to download the instructions from the portable/external/remote storage medium. In this situation, the executable instructions may be part of an "installation package". As described herein, machine-readable storage medium 320 may be encoded with executable instructions related to alerts of virtual reality devices. That is, using processing resource 318, machine-readable storage medium 320 may cause a MR device to generate an alert in response to an input from a building sensor, among other operations.

Instructions 322, when executed by processing resource 318, may cause system 316 to receive an input from a building sensor included in a building automation system of a building in response to the building sensor detecting an event. The building sensor can be, for example, a light sensor, a motion sensor, an audio sensor, a visual sensor, an ingress sensor, among other types of sensors.

Instructions 324, when executed by processing resource 318, may cause system 316 to cause a MR device located in the building to generate an alert in response to the input from the building sensor. The alert can include a visual alert, an audio alert, and/or a haptic feedback alert, among other types of alerts.

Figure 4:
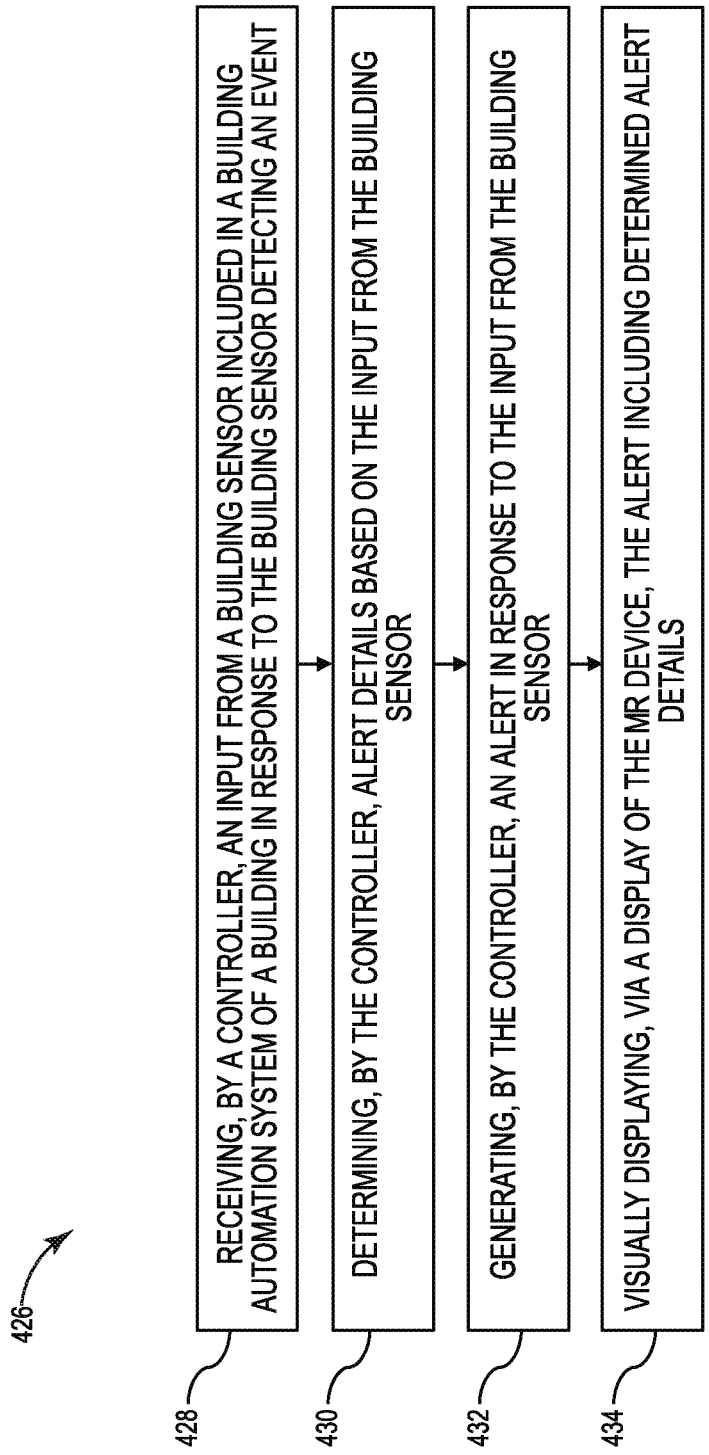
FIG. 4 illustrates an example of a method for alerts of virtual reality devices consistent with the disclosure.

FIG. 4 illustrates an example of a method 426 for alerts of virtual reality devices consistent with the disclosure. For example, method 426 can be performed by a controller of a MR device (e.g., MR device 102, previously described in connection with FIG. 1) to generate an alert in response to an input from a building sensor, among other operations.

At 428, the method 426 includes receiving, by a controller of a mixed reality (MR) device, an input from a building sensor included in a building automation system of a building in response to the building sensor detecting an event. The building sensor can be, for example, a light sensor, a motion sensor, an audio sensor, a visual sensor, an ingress sensor, among other types of sensors.

At 430, the method 426 includes determining, by the controller, alert details based on the input from the building sensor. The alert details can include a type of building sensor that detected the event and/or a location of the building sensor that detected the event.

At 432, the method 426 includes generating, by the controller, an alert in response to the input from the building sensor. The alert can include a visual alert, an audio alert, and/or a haptic feedback alert, among other types of alerts.

At 434, the method 426 includes visually displaying, via a display of the MR device, the alert including the determined alert details. For example, the display of the MR device can display alert details including the type of building sensor that detected the event and/or a location of the building sensor that detected the event, among other types of alert details.

The above specification, examples, and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A system, comprising:
   a motion sensor; and
   a head mounted mixed reality (MR) device comprising:
      a processing resource; and
      a memory resource storing machine readable instructions to cause the processing resource to:
         receive an input from the motion sensor in response to the motion sensor detecting motion;
         determine whether the detected motion is motion of the MR device or motion of a different object; and
         generate an alert in response to the motion being motion of the different object.

2. The system of claim 1, wherein the motion sensor is included in a building automation system.

3. The system of claim 1, wherein the alert includes at least one of:
   a visual alert;
   an audio alert; and
   a haptic feedback alert.

4. The system of claim 1, wherein the detected motion is located in an environment in which the head mounted MR device is located.

5. The system of claim 1, wherein the detected motion is located outside of an environment in which the head mounted MR device is located.

6. The system of claim 1, wherein the motion sensor is located in an environment in which the head mounted MR device is located.

7. The system of claim 1, wherein the motion sensor is located outside of an environment in which the head mounted MR device is located.

8. The system of claim 1, wherein the head mounted MR device covers eyes of a user.

9. The system of claim 1, wherein the processing resource is to generate the alert while the head mounted MR device provides a virtual reality to a user of the MR device.

10. A non-transitory machine-readable storage medium having stored thereon machine-readable instructions to cause a processing resource to:
    receive an input from a motion sensor included in a building automation system of a building in response to the motion sensor detecting motion;
    determine whether the detected motion is motion of a head mounted mixed reality (MR) device or motion of a different object; and
    cause the MR device located in the building to generate an alert in response to the motion being motion of the different object.

11. The medium of claim 10, wherein:
    the alert is a visual alert; and
    further comprising instructions to cause the processing resource to display the visual alert on a display of the head mounted MR device, wherein the displayed alert includes a direction of the motion sensor that detected the event from the head mounted MR device relative to an orientation of the head mounted MR device.

12. The medium of claim 10, wherein:
    the alert is a visual alert; and
    further comprising instructions to cause the processing resource to display the visual alert on a display of the head mounted MR device, wherein the displayed alert includes
    a location of the motion sensor that detected the event.

13. The medium of claim 10, further comprising instructions to cause the processing resource to cause the MR device to refrain from generating the alert in response to the motion being motion of the MR device.

14. A method, comprising:
    receiving, by a controller of a head mounted mixed reality (MR) device, an input from a motion sensor included in a building automation system of a building in response to the motion sensor detecting motion;
    determining, by the controller, whether the detected motion is motion of the MR device or motion of a different object;
    determining, by the controller, alert details based on the input from the building sensor, wherein the alert details include
    a location of the motion sensor that detected the event;
    generating, by the controller, an alert in response to the motion being motion of the different object; and
    visually displaying, via a display of the head mounted MR device, the alert including the determined alert details.

15. The method of claim 14, wherein the method further includes generating, by the head mounted MR device, an audio alert via an audio output device of the head mounted MR device.

16. The method of claim 14, wherein the method further includes generating, by the head mounted MR device, a haptic feedback alert via vibrating pads of the head mounted MR device.

* * * * *